(No Model.)
E. M. BOYNTON.
Crosscut Saw.
No. 239,710. Patented April 5, 1881.
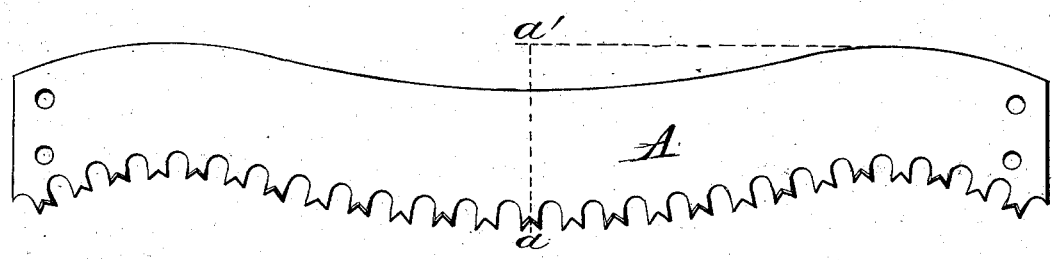

UNITED STATES PATENT OFFICE.

EBEN MOODY BOYNTON, OF WEST NEWBURY, MASSACHUSETTS.

CROSSCUT-SAW.

SPECIFICATION forming part of Letters Patent No. 239,710, dated April 5, 1881.

Application filed February 2, 1881. (No model.)

*To all whom it may concern:*

Be it known that I, EBEN MOODY BOYNTON, a citizen of the United States, residing at West Newbury, in the county of Essex and State of Massachusetts, have invented certain new and useful Improvements in Crosscut-Saws; and I do hereby declare the following to be a full, clear, and exact description of the invention, such as will enable others skilled in the art to which it appertains to make and use the same, reference being had to the accompanying drawing, and to letters or figures of reference marked thereon, which forms a part of this specification.

My invention relates to improvements in saws; and it consists in forming the saw-blade with a reduced swell or curve by dividing or reversing the swell between the ends and middle of the sawing-edge, whereby economy of material is attained with the advantage of diminished friction and increased strength and lightness resulting from employing a narrow thin blade with reversed curves, as hereinafter more fully described and claimed.

The annexed drawing represents a view of my improved saw.

A is the saw, which, owing to the form given to the blade, as illustrated in the drawing, may be made of less thickness and breadth without impairing its strength than is practicable with saws of the ordinary construction. This is attained by providing the cutting-edge of the saw with reversed curves, so arranged that the swell of the saw progressing from the belly *a* toward each end shall gradually return to a point at each end nearly or quite on a line with the extreme edge of the belly. The back or upper edge of the saw is curved in a similar or corresponding manner with the toothed edge.

By this construction the saw will have a strength proportioned to the quantity of material that might have been included between the extreme points of its two opposite edges, or a strength and capacity of resisting strain equal to if not exceeding that of a saw having a breadth extending between the points $a$ $a'$. A saw of this form can also be operated with less set, it having a smaller frictional surface, and with less than ordinary expenditure of power. It is also better adapted to the use of patent handles, for the attachment of which suitable openings are made at each end, and may be thus operated without such danger of strain and buckling as is liable with the ordinary hollow-back saw.

The saw-teeth represented in the drawing are all clearers as well as cutters. The cutting-edge of these teeth are alternately on each side of the blade, and the teeth are set alternately to the right and left. Any suitable form of tooth may be used, however, with any set that may be found convenient.

This method of construction furnishes a practical saw that can be made with a great saving of material, resulting from the uniform cutting possible in forming the saw.

Having thus described my invention, what I claim as new, and desire to secure by Letters Patent, is—

As a new article of manufacture, a saw having its edges formed with reversed curves or swells, and provided with suitable teeth, said curves being so arranged on each edge of the saw as to permit its breadth and thickness to be diminished, so as to lessen its frictional surface and allow a less set to the teeth without impairing the strength of the saw or rendering it liable to buckle, substantially as set forth.

In testimony whereof I affix my signature in presence of two witnesses.

EBEN MOODY BOYNTON.

Witnesses:
A. R. BROWN,
JOHN J. BYRNE.